US011860810B2

(12) United States Patent
Atta et al.

(10) Patent No.: US 11,860,810 B2
(45) Date of Patent: *Jan. 2, 2024

(54) CONFIGURABLE LOGIC PLATFORM

(71) Applicant: Amazon Technologies, Inc., Seattle, WA (US)

(72) Inventors: Islam Atta, Vancouver (CA); Christopher Joseph Pettey, Woodinville, WA (US); Asif Khan, Cedar Park, TX (US); Robert Michael Johnson, Austin, TX (US); Mark Bradley Davis, Austin, TX (US); Erez Izenberg, Tel Aviv (IL); Nafea Bshara, San Jose, CA (US); Kypros Constantinides, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,144

(22) Filed: Sep. 23, 2022

(65) Prior Publication Data

US 2023/0018032 A1 Jan. 19, 2023

Related U.S. Application Data

(63) Continuation of application No. 17/184,507, filed on Feb. 24, 2021, now Pat. No. 11,474,966, which is a (Continued)

(51) Int. Cl.
*G06F 13/40* (2006.01)
*G06F 9/445* (2018.01)
(Continued)

(52) U.S. Cl.
CPC ...... *G06F 13/4068* (2013.01); *G06F 9/44505* (2013.01); *G06F 13/4282* (2013.01); *G06F 15/7867* (2013.01); *G06F 15/7871* (2013.01)

(58) Field of Classification Search
None
See application file for complete search history.

(56) References Cited

U.S. PATENT DOCUMENTS 6,530,049 B1 3/2003 Abramovici et al.
6,668,237 B1 12/2003 Guccione et al.
(Continued)

FOREIGN PATENT DOCUMENTS

CN 103477561 A 12/2013
CN 104583986 A 4/2015
(Continued)

OTHER PUBLICATIONS

'IPRDF: An Isolated Partial Reconfiguration Design Flow for Xilinx FPGAs' by Khoa Dang Pham, 2018 IEEE 12th International Symposium on Embedded Multicore/Many-core Systems-on-Chip. (Year: 2018).*
(Continued)

*Primary Examiner* — Steven G Snyder
(74) *Attorney, Agent, or Firm* — Kilpatrick Townsend & Stockton LLP

(57) ABSTRACT

The following description is directed to a configurable logic platform. In one example, a configurable logic platform includes host logic and a reconfigurable logic region. The reconfigurable logic region can include logic blocks that are configurable to implement application logic. The host logic can be used for encapsulating the reconfigurable logic region. The host logic can include a host interface for communicating with a processor. The host logic can include a management function accessible via the host interface. The management function can be adapted to cause the reconfigurable logic region to be configured with the application logic in response to an authorized request from the host interface. The host logic can include a data path function accessible via the host interface. The data path function can
(Continued)

include a layer for formatting data transfers between the host interface and the application logic.

20 Claims, 8 Drawing Sheets

Related U.S. Application Data continuation of application No. 16/287,986, filed on Feb. 27, 2019, now Pat. No. 10,963,414, which is a continuation of application No. 15/279,232, filed on Sep. 28, 2016, now Pat. No. 10,223,317.

(51) Int. Cl.
*G06F 13/42* (2006.01)
*G06F 15/78* (2006.01)

(56) References Cited

U.S. PATENT DOCUMENTS

| | | |
|---|---|---|
| 6,867,614 B1 | 3/2005 | Le Graverand et al. |
| 6,966,020 B1 | 11/2005 | Abramovici et al. |
| 7,203,842 B2 | 4/2007 | Kean |
| 7,275,163 B2 | 9/2007 | Cocchi et al. |
| 7,315,897 B1 | 1/2008 | Hardee et al. |
| 7,555,617 B2 | 6/2009 | Timmermans et al. |
| 7,739,520 B2 | 6/2010 | Horvat et al. |
| 7,795,901 B1 | 9/2010 | Yang et al. |
| 8,316,439 B2 | 11/2012 | Fang et al. |
| 8,516,268 B2 | 8/2013 | Woodall |
| 8,554,953 B1 | 10/2013 | Sorensen et al. |
| 8,561,183 B2 | 10/2013 | Muth et al. |
| 8,595,832 B1 | 11/2013 | Yee et al. |
| 8,850,574 B1 | 9/2014 | Ansel et al. |
| 9,170,911 B1 | 10/2015 | Atsatt et al. |
| 9,483,282 B1 | 11/2016 | Vandervennet et al. |
| 9,503,093 B2 | 11/2016 | Karras et al. |
| 9,589,088 B1 | 3/2017 | Mishra et al. |
| 9,690,600 B2 | 6/2017 | Jung et al. |
| 10,048,977 B2 | 8/2018 | Palermo et al. |
| 10,133,594 B1 | 11/2018 | Zhang et al. |
| 10,162,921 B2 | 12/2018 | Atta |
| 10,203,967 B1 | 2/2019 | Atta et al. |
| 10,223,317 B2 | 3/2019 | Atta et al. |
| 10,250,572 B2 | 4/2019 | Atta et al. |
| 10,282,330 B2 | 5/2019 | Khan et al. |
| 10,326,651 B1* | 6/2019 | Johnson .............. H04L 67/34 |
| 10,338,135 B2 | 7/2019 | Davis et al. |
| 10,423,438 B2 | 9/2019 | Atta et al. |
| 10,540,186 B1 | 1/2020 | Johnson et al. |
| 10,642,492 B2 | 5/2020 | Davis et al. |
| 10,705,995 B2 | 7/2020 | Khan et al. |
| 10,795,742 B1 | 10/2020 | Khan et al. |
| 10,963,001 B1 | 3/2021 | Atta et al. |
| 10,963,414 B2 | 3/2021 | Atta et al. |
| 11,099,894 B2 | 8/2021 | Davis et al. |
| 11,115,293 B2 | 9/2021 | Johnson et al. |
| 11,182,320 B2* | 11/2021 | Khan .............. G06F 13/4068 |
| 11,316,733 B1* | 4/2022 | Johnson .............. H04L 41/0813 |
| 11,347,556 B2 | 5/2022 | Sandstrom |
| 11,385,934 B2 | 7/2022 | Sandstrom |
| 11,474,966 B2* | 10/2022 | Atta .............. G06F 13/4282 |
| 11,533,224 B2* | 12/2022 | Khan .............. G06F 30/392 |
| 2002/0194548 A1 | 12/2002 | Tetreault |
| 2002/0199110 A1 | 12/2002 | Kean |
| 2003/0208606 A1 | 11/2003 | Maguire et al. |
| 2005/0223214 A1 | 10/2005 | DeLeeuw |
| 2005/0223227 A1 | 10/2005 | DeLeeuw |
| 2005/0251040 A1 | 11/2005 | Relkuntwar et al. |
| 2007/0220367 A1 | 9/2007 | Smith et al. |
| 2007/0283311 A1 | 12/2007 | Karoubalis et al. |
| 2008/0046997 A1 | 2/2008 | Wang |
| 2008/0082881 A1 | 4/2008 | Szydlowski |
| 2008/0270805 A1 | 10/2008 | Kean |
| 2009/0132821 A1 | 5/2009 | Matsuzaki |
| 2009/0282477 A1 | 11/2009 | Chen et al. |
| 2012/0005473 A1 | 1/2012 | Hofstee et al. |
| 2012/0047371 A1 | 2/2012 | Woodall |
| 2013/0265067 A1 | 10/2013 | Leedy |
| 2014/0181491 A1 | 6/2014 | Kakolaki et al. |
| 2014/0215424 A1 | 7/2014 | Fine et al. |
| 2014/0297405 A1 | 10/2014 | Fine |
| 2014/0344581 A1 | 11/2014 | Grieco et al. |
| 2015/0100772 A1 | 4/2015 | Jung et al. |
| 2015/0121060 A1 | 4/2015 | Mimms et al. |
| 2015/0150118 A1 | 5/2015 | Addepalli et al. |
| 2015/0193515 A1 | 7/2015 | Thyagarajan et al. |
| 2015/0278041 A1 | 10/2015 | Ganesan et al. |
| 2016/0034404 A1 | 2/2016 | Doster et al. |
| 2016/0139811 A1 | 5/2016 | Ikeuchi |
| 2016/0313370 A1 | 10/2016 | Neeb et al. |
| 2016/0321113 A1 | 11/2016 | Pinto et al. |
| 2016/0380635 A1 | 12/2016 | Roberts |
| 2017/0024573 A1 | 1/2017 | Bhattacharyya et al. |
| 2017/0031699 A1 | 2/2017 | Banerjee et al. |
| 2017/0339234 A1 | 11/2017 | Vajravel |
| 2018/0088174 A1 | 3/2018 | Davis et al. |
| 2018/0088992 A1 | 3/2018 | Davis et al. |
| 2018/0089119 A1 | 3/2018 | Khan et al. |
| 2018/0089132 A1 | 3/2018 | Atta et al. |
| 2018/0089343 A1 | 3/2018 | Atta |
| 2018/0091484 A1 | 3/2018 | Atta et al. |
| 2018/0095670 A1 | 4/2018 | Davis et al. |
| 2018/0139110 A1 | 5/2018 | Johnson et al. |
| 2019/0213155 A1 | 7/2019 | Khan et al. |

FOREIGN PATENT DOCUMENTS

| | | |
|---|---|---|
| EP | 1124330 A1 | 8/2001 |
| JP | 2005157974 A | 6/2005 |
| JP | 2005527042 A | 9/2005 |
| JP | 2008523727 A | 7/2008 |
| JP | 2015211295 A | 11/2015 |
| WO | 0209285 A2 | 1/2002 |
| WO | 2012040691 A1 | 3/2012 |
| WO | 2018064100 A1 | 4/2018 |
| WO | 2018195156 A1 | 10/2018 |
| WO | 2019217931 A1 | 11/2019 |

OTHER PUBLICATIONS

"Design of a Secure Control Plane Bridge", Microsemi, 2013, pp. 1-11.
"Introduction to Implementing Design Security with Microsemi SmartFusion2 and IGL002 FPGAs", Microsemi, Nov. 2013, pp. 1-13.
"SDAccel Development Environment User Guide", Xilinx, Inc., Features and Development Flows, Feb. 16, 2016, 85 pages.
"The Xilinx SDAccel Development Environment Bringing the Best Performance/Watt to the Data Center", Xilinx, Inc., Nov. 17, 2014, 6 pages.
U.S. Appl. No. 15/279,232 , "Non Final Office Action", dated Apr. 27, 2018, 33 pages.
U.S. Appl. No. 15/279,232 , "Notice of Allowance", dated Nov. 1, 2018, 9 pages.
U.S. Appl. No. 15/279,232 , "U.S. Patent Application No.", Configurable Logic Platform, Sep. 28, 2016, 56 pages.
U.S. Appl. No. 15/638,080 , "Advisory Action", dated May 13, 2020, 5 pages.
U.S. Appl. No. 15/638,080 , "Advisory Action", dated Oct. 1, 2019, 6 pages.
U.S. Appl. No. 15/638,080 , "Final Office Action", dated Feb. 26, 2020, 15 pages.
U.S. Appl. No. 15/638,080 , "Final Office Action", dated Jul. 15, 2019, 20 pages.
U.S. Appl. No. 15/638,080 , "Non-Final Office Action", dated Mar. 8, 2019, 18 pages.
U.S. Appl. No. 15/638,080 , "Non-Final Office Action", dated Nov. 4, 2019, 9 pages.

(56) References Cited

OTHER PUBLICATIONS

U.S. Appl. No. 15/638,080, "Notice of Allowance", dated May 20, 2020, 8 pages.
U.S. Appl. No. 15/638,080, "U.S. Patent Application No.", Isolating Unresponsive Customer Logic from a Bus, Jun. 29, 2017, 63 pages.
U.S. Appl. No. 16/287,986, "Corrected Notice of Allowability", dated Jan. 25, 2021, 5 pages.
U.S. Appl. No. 16/287,986, "Corrected Notice of Allowability", dated Mar. 2, 2021, 5 pages.
U.S. Appl. No. 16/287,986, "Final Office Action", dated Aug. 28, 2020, 21 pages.
U.S. Appl. No. 16/287,986, "Non-Final Office Action", dated Mar. 19, 2020, 21 pages.
U.S. Appl. No. 16/287,986, "Notice of Allowance", dated Dec. 2, 2020, 9 pages.
U.S. Appl. No. 17/184,507, "Notice of Allowance", dated Jun. 15, 2022, 10 pages.
BYMA et al., "FPGAs in the Cloud: Booting Virtualized Hardware Accelerators with OpenStack", 22nd Annual International Symposium on Field-Programmable Custom Computing Machines, May 2014, pp. 109-116
CN201780059743.8, "Notice of Decision to Grant", dated Apr. 1, 2021, 4 pages.
CN201780059743.8, "Office Action", dated May 22, 2020, 12 pages.
CN201780059743.8, "Office Action", dated Oct. 9, 2019, 19 pages.
EP17783643.4, "Office Action", dated Mar. 16, 2020, 12 pages.
EP17783643.4, "Summons to Attend Oral Proceedings", Sep. 22, 2020, 14 pages.
JP2019-516662, "Notice of Decision to Grant", dated Jun. 26, 2020, 6 pages.
JP2019-516662, "Offce Action", dated Oct. 11, 2019, 5 pages.
JP2020-003285, "Notice of Decision to Grant", dated Aug. 17, 2021, 6 pages.
JP2020-003285, "Office Action", dated Mar. 1, 2021, 6 pages.
Kwok, "High Performance Embedded Reconfigurable Computing: Data Security and Media Processing Applications", Available online at: http://hub.hku.hk/handle/10722/26680, Oct. 10, 2005, 99 pages.
PCT/US2017/053599, "International Preliminary Report on Patentability", dated Apr. 11, 2019, 11 pages.
PCT/US2017/053599, "International Search Report and Written Opinion", dated Jan. 5, 2018, 16 pages.
Shin et al., "Avant-Guard: Scalable and Vigilant Switch Flow Management in Software-Defined Networks", Computer & Communications Security, Nov. 4-8, 2013, pp. 413-424.
Unnikrishnan et al., "ReClick—A Modular Dataplane Design Framework for FPGA-Based Network Virtualization", Seventh ACM/IEEE Symposium on Architectures for Networking and Communications Systems, 2011, 11 pages.
CN201780059743.8, "Office Action", dated Dec. 18, 2020, 5 pages.
EP17783643.4, "Summons to Attend Oral Proceedings", Nov. 8, 2022, 22 pages.
EP17783643.4, "Intention to Grant", dated Oct. 10, 2023, 12 pages.

\* cited by examiner

CONFIGURABLE LOGIC PLATFORM

CROSS REFERENCE TO RELATED APPLICATIONS

This application is a Continuation of and claims priority to U.S. application Ser. No. 17/184,507, filed Feb. 24, 2021, titled "CONFIGURABLE LOGIC PLATFORM", which is a Continuation of U.S. application Ser. No. 16/287,986, filed Feb. 27, 2019, titled "CONFIGURABLE LOGIC PLATFORM", issued as U.S. Pat. No. 10,963,414 on Mar. 30, 2021, which is a Continuation of U.S. application Ser. No. 15/279,232, filed Sep. 28, 2016, and titled "CONFIGURABLE LOGIC PLATFORM," issued as U.S. Pat. No. 10,223,317 on Mar. 5, 2019, the contents of which are herein incorporated in their entireties.

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

The users of large computer systems may have diverse computing requirements resulting from different use cases. A compute service provider can include various different computer systems having different types of components with varying levels of performance and/or functionality. Thus, a user can select a computer system that can potentially be more efficient at executing a particular task. For example, the compute service provider can provide systems with varying combinations of processing performance, memory performance, storage capacity or performance, and networking capacity or performance. However, some users may desire to use hardware that is proprietary or highly specialized for executing their computing tasks. Thus, the compute service provider can be challenged to provide specialized computing hardware for these users while keeping a healthy mix of generalized resources so that the resources can be efficiently allocated among the different users.

DETAILED DESCRIPTION

Figure 1:
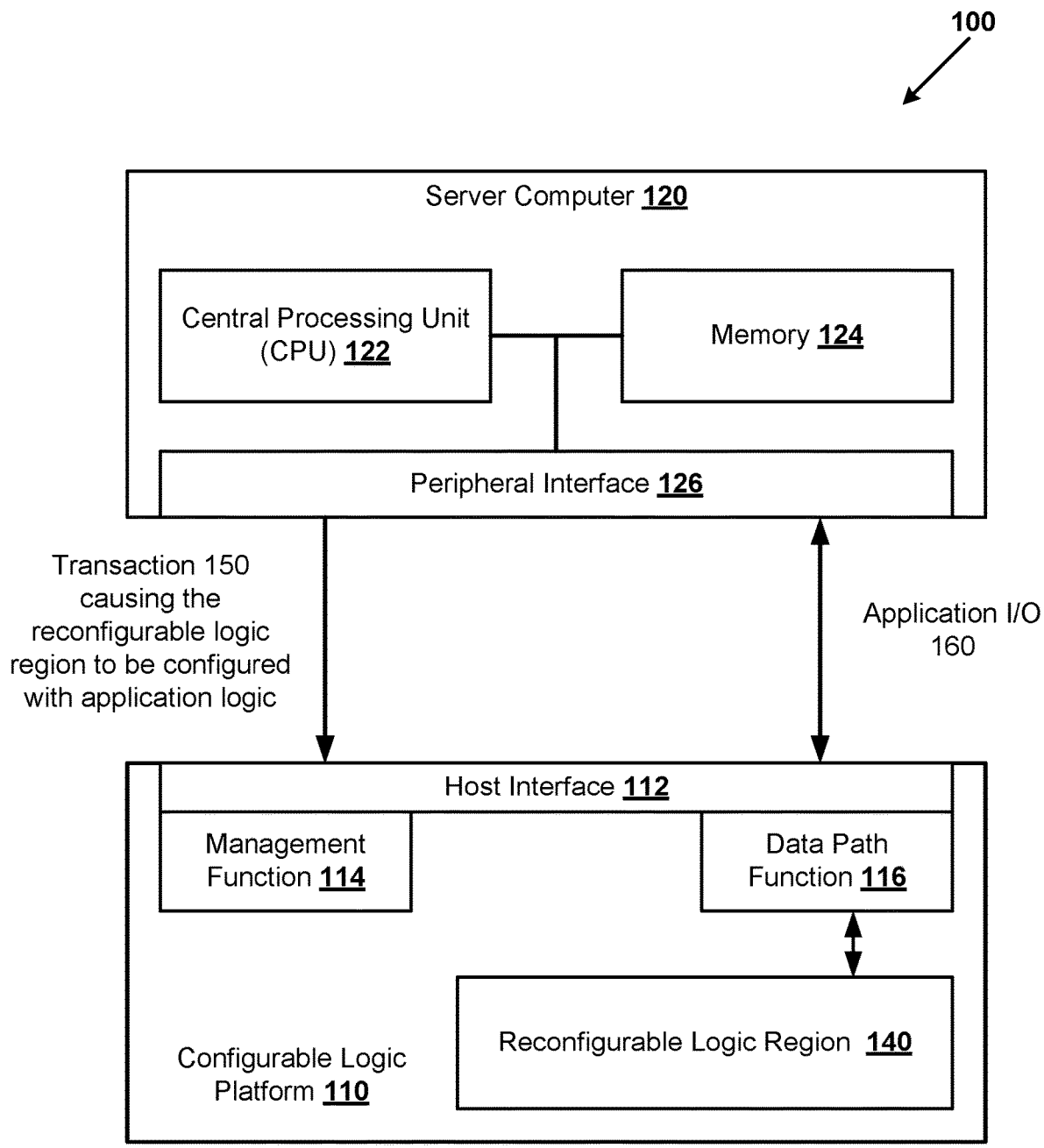
FIG. 1 is a system diagram showing an example of a system including a configurable logic platform.

One solution for providing specialized computing resources within a set of reusable general computing resources is to provide a server computer comprising a configurable logic platform (such as by providing a server computer with an add-in card including a field-programmable gate array (FPGA)) as a choice among the general computing resources. Configurable logic is hardware that can be programmed or configured to perform a logic function that is specified by configuration data that is applied to or loaded on the configurable logic. For example, a user of the computing resources can provide a specification (such as source code written in a hardware description language) for configuring the configurable logic, the configurable logic can be configured according to the specification, and the configured logic can be used to perform a task for the user. However, allowing a user access to low-level hardware of the computing facility can potentially introduce security and privacy issues within the computing facility. As a specific example, a faulty or malicious design from one user could potentially cause a denial of service to other users if the configured logic caused one or more server computers within the computing facility to malfunction (e.g., crash, hang, or reboot) or be denied network services. As another specific example, a faulty or malicious design from one user could potentially corrupt or read data from another user if the configured logic is able to read and/or write memory of the other user's memory space.

As described herein, a compute services facility can include a variety of computing resources, where one type of the computing resources can include a server computer comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. As a specific example, the hardware accelerator can be accessible via a local interconnect, such as Peripheral Component Interconnect Express (PCI-Express or PCIe), of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application.

The compute services provider can potentially increase the security and/or availability of the computing resources by wrapping or encapsulating the user's hardware accelerator (also referred to herein as application logic) within host logic of the configurable logic platform. Encapsulating the application logic can include limiting or restricting the application logic's access to configuration resources, physical interfaces, hard macros of the configurable logic platform, and various peripherals of the configurable logic platform. For example, the compute services provider can manage the programming of the configurable logic platform so that it includes both the host logic and the application logic. The host logic can provide a framework or sandbox for the application logic to work within. In particular, the host logic can communicate with the application logic and constrain the functionality of the application logic. For example, the host logic can perform bridging functions between the local interconnect (e.g., the PCIe interconnect) and the application logic so that the application logic cannot directly control the signaling on the local interconnect. The host logic can be responsible for forming packets or bus transactions on the local interconnect and ensuring that the protocol requirements are met. By controlling transactions on the local interconnect, the host logic can potentially prevent malformed transactions or transactions to out-of-bounds locations. As another example, the host logic can isolate a configuration access port so that the application logic cannot cause the configurable logic platform to be reprogrammed without using services provided by the compute services provider.

FIG. 1 is a system diagram showing an example of a computing system 100 including a configurable logic platform 110 and a server computer 120. For example, the server computer 120 can be used to execute an application program for an end-user. Specifically, the server computer 120 can include a central processing unit (CPU) 122, memory 124, and a peripheral interface 126. The CPU 122 can be used to execute instructions stored in the memory 124. For example, the memory 124 can be loaded with all or a portion of the application program and the CPU 122 can execute the instructions of the application program. The application program can communicate with a hardware accelerator of the configurable logic platform 110 by issuing transactions using the peripheral interface 126.

As used herein, a transaction is a communication between components. As specific examples, a transaction can be a read request, a write, a read response, a message, an interrupt, or other various exchanges of information between components. The transaction can occur on a bus shared by multiple components. Specifically, values of signal lines of the bus can be modulated to transfer information on the bus using a communications protocol of the bus. The transaction can occur over one or more phases, such as an address phase and one or more data phases. Additionally or alternatively, the transaction can occur using one or more serial lines of a point-to-point interconnect that connects two components. Specifically, the transaction can be sent in a packet that is transmitted over the point-to-point interconnect.

The peripheral interface 126 can include a bridge for communicating between the CPU 122 using a local or front-side interconnect and components using a peripheral or expansion interconnect. Specifically, the peripheral interface 126 can be connected to a physical interconnect that is used to connect the server computer 120 to the configurable logic platform 110 and/or to other components. For example, the physical interconnect can be an expansion bus for connecting multiple components together using a shared parallel bus or serial point-to-point links. As a specific example, the physical interconnect can be PCI express, PCI, or another physical interconnect that tightly couples the server computer 120 to the configurable logic platform 110. Thus, the server computer 120 and the configurable logic platform 110 can communicate using PCI bus transactions or PCIe packets, for example.

The configurable logic platform 110 can include host logic and a reconfigurable logic region 140. The host logic can include a host interface 112, a management function 114, and data path function 116. The reconfigurable logic region 140 can include hardware that is configurable to implement the hardware accelerator or application logic. In other words, the reconfigurable logic region 140 can include logic that is programmable to perform a given function. For example, the reconfigurable logic region 140 can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins.

The host logic can be used to encapsulate the reconfigurable logic region 140. For example, the reconfigurable logic region 140 can interface with various components of the configurable hardware platform using predefined interfaces so that the reconfigurable logic region 140 is restricted in the functionality that it can perform. As one example, the reconfigurable logic region can interface with static host logic that is loaded prior to the reconfigurable logic region 140 being configured. For example, the static host logic can include logic that isolates different components of the configurable logic platform 110 from the reconfigurable logic region 140. As one example, hard macros of the configurable logic platform 110 (such as a configuration access port or circuits for signaling on the physical interconnect) can be masked off so that the reconfigurable logic region 140 cannot directly access the hard macros.

The host logic can include the host interface 112 for communicating with the server computer 120. Specifically, the host interface 112 can be used to connect to the physical interconnect and to communicate with the server computer 120 using a communication protocol of the physical interconnect. As one example, the server computer 120 can communicate with the configurable logic platform 110 using a transaction including an address associated with the configurable logic platform 110. Similarly, the configurable logic platform 110 can communicate with the server computer 120 using a transaction including an address associated with the server computer 120. The addresses associated with the various devices connected to the physical interconnect can be predefined by a system architect and programmed into software residing on the devices. Additionally or alternatively, the communication protocol can include an enumeration sequence where the devices connected to the physical interconnect are queried and where addresses are assigned to each of devices as part of the enumeration sequence. As one example, the peripheral interface 126 can issue queries to each of the devices connected to the physical interconnect. The host interface 112 can respond to the queries by providing information about the configurable logic platform 110, such as how many functions are present on the configurable logic platform 110, and a size of an address range associated with each of the functions of the configurable logic platform 110. Based on this information, addresses of the computing system 100 can be allocated such that each function of each device connected to the physical interconnect is assigned a non-overlapping range of addresses. After enumeration, the host interface 112 can route transactions to functions of the configurable logic platform 110 based on an address of the transaction.

The host logic can include the management function 114 that can be used for managing and configuring the configurable logic platform 110. Commands and data can be sent from the server computer 120 to the management function 114 using transactions that target the address range of the management function 114. For example, the server computer 120 can generate transactions to transfer data (e.g., configuration data) and/or write control registers of the configurable logic platform 110 that are mapped to one or more addresses within the address range of the management function 114. Writing the control registers can cause the configurable logic platform 110 to perform operations, such as configuring and managing the configurable logic platform 110. As a specific example, configuration data corresponding to application logic to be implemented in the reconfigurable logic region 140 can be transmitted from the server computer 120 to the configurable logic platform 110 in one or more transactions over the physical interconnect. A transaction 150 to configure the reconfigurable logic region 140 with the configuration data can be transmitted from the server computer 120 to the configurable logic platform 110. Specifically, the transaction 150 can write a value to a control register mapped to the management function 114 address space that will begin configuring the reconfigurable logic region 140. In one embodiment, the configuration data can be transferred from the server computer 120 to the configurable logic platform 110 before the configuration of the reconfigurable logic region 140 begins. For example, the management function 114 can cause the configuration data to be stored in an on-chip or off-chip memory accessible by the configurable logic platform 110, and the configuration data can be read from the memory when the reconfigurable logic region 140 is being configured. In another embodiment, the configuration data can be transferred from the server computer 120 to the configurable logic platform 110 after the configuration of the reconfigurable logic region 140 begins. For example, a control register can be written to begin configuration of the reconfigurable logic region 140 and the configuration data can be streamed into or loaded onto the reconfigurable logic region 140 as transactions including the configuration data are processed by the management function 114.

The host logic can include a data path function 116 that can be used to exchange information (e.g., application input/output 160) between the server computer 120 and the configurable logic platform 110. Specifically, commands and data can be sent from the server computer 120 to the data path function 116 using transactions that target the address range of the data path function 116. Similarly, the configurable logic platform 110 can communicate with the server computer 120 using a transaction including an address associated with the server computer 120. The data path function 116 can act as a translation layer between the host interface 112 and the reconfigurable logic region 140. Specifically, the data path function 116 can include an interface for receiving information from the reconfigurable logic region 140 and the data path function 116 can format the information for transmission from the host interface 112. Formatting the information can include generating control information for one or more transactions and partitioning data into blocks that are sized to meet protocol specifications. Thus, the data path function 116 can be interposed between the reconfigurable logic region 140 and the physical interconnect. In this manner, the reconfigurable logic region 140 can potentially be blocked from formatting transactions and directly controlling the signals used to drive the physical interconnect so that the reconfigurable logic region 140 cannot be used to inadvertently or maliciously violate protocols of the physical interconnect.

Figure 2:
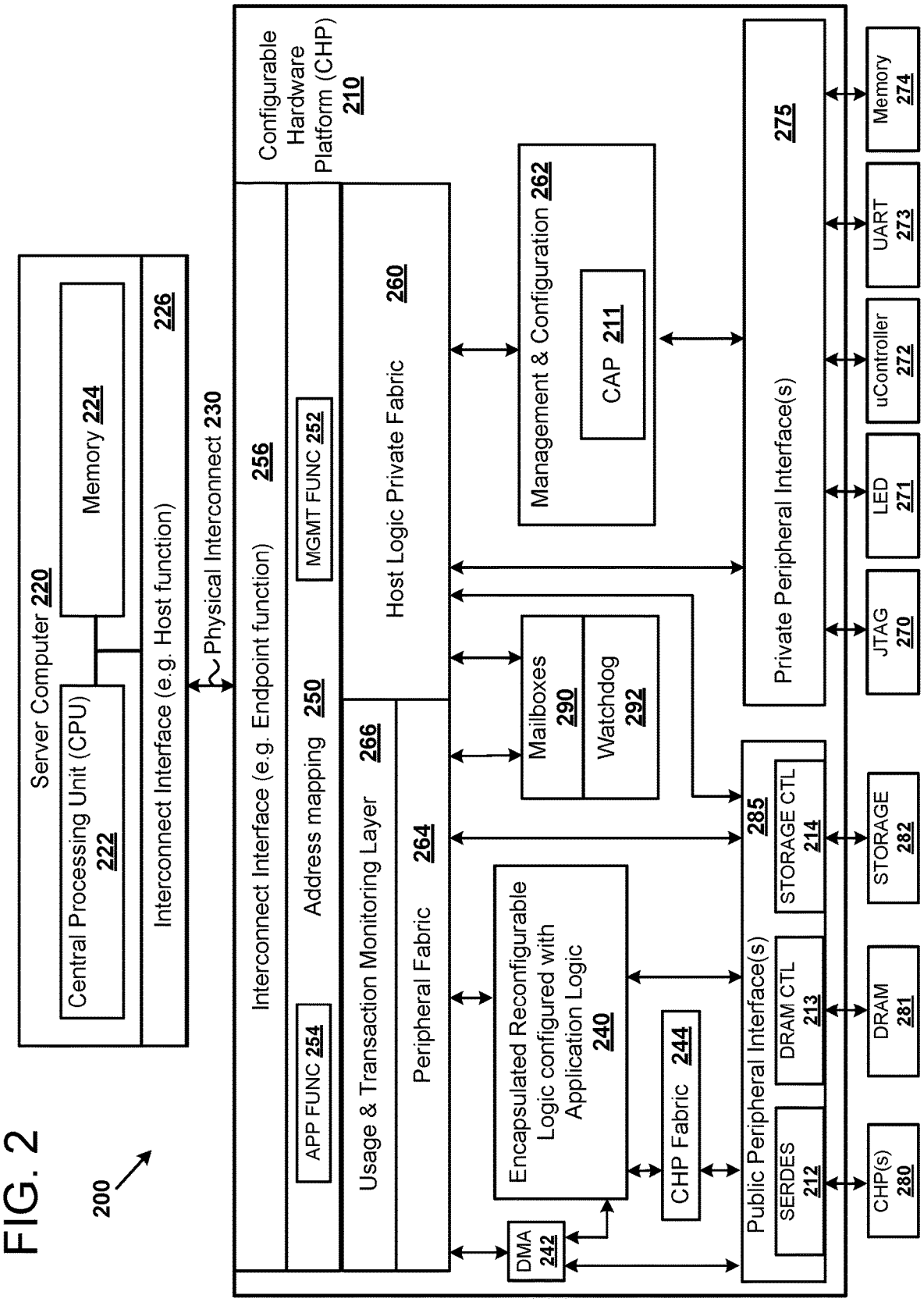
FIG. 2 is a system diagram showing another example of a system including a configurable logic platform.

FIG. 2 is a system diagram showing an example of a system 200 including a configurable hardware platform 210 and a server computer 220. The server computer 220 and the configurable hardware platform 210 can be connected via a physical interconnect 230. For example, the physical interconnect 230 can be PCI express, PCI, or any other interconnect that tightly couples the server computer 220 to the configurable hardware platform 210. The server computer 220 can include a CPU 222, memory 224, and an interconnect interface 226. For example, the interconnect interface 226 can provide bridging capability so that the server computer 220 can access devices that are external to the server computer 220. For example, the interconnect interface 226 can include a host function, such as root complex functionality as used in PCI express.

The configurable hardware platform 210 can include reconfigurable logic blocks and other hardware. The reconfigurable logic blocks can be configured or programmed to perform various functions of the configurable hardware platform 210. The reconfigurable logic blocks can be programmed multiple times with different configurations so that the blocks can perform different functions over the lifetime of the device. The functions of the configurable hardware platform 210 can be categorized based upon the purpose or capabilities of each function, or based upon when the function is loaded into the configurable hardware platform 210. For example, the configurable hardware platform 210 can include static logic, reconfigurable logic, and hard macros. The functionality for the static logic, reconfigurable logic, and hard macros can be configured at different times. Thus, the functionality of the configurable hardware platform 210 can be loaded incrementally.

A hard macro can perform a predefined function and can be available when the configurable hardware platform 210 is powered on. For example, a hard macro can include hard-wired circuits that perform a specific function. As specific examples, the hard macros can include a configuration access port (CAP) 211 for configuring the configurable hardware platform 210, a serializer-deserializer transceiver (SERDES) 212 for communicating serial data, a memory or dynamic random access memory (DRAM) controller 213 for signaling and controlling off-chip memory (such as a double data rate (DDR) DRAM 281), and a storage controller 214 for signaling and controlling a storage device 282.

The static logic can be loaded at boot time onto reconfigurable logic blocks. For example, configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and deasserting a reset signal in response to the power event. An initialization sequence can be triggered in response to the power event or the reset being deasserted. The initialization sequence can include reading configuration data stored on the flash device and loading the configuration data onto the configurable hardware platform 210 using the configuration access port 211 so that at least a portion of the reconfigurable logic blocks are programmed with the functionality of the static logic. After the static logic is loaded, the configurable hardware platform 210 can transition from a loading state to an operational state that includes the functionality of the static logic.

The reconfigurable logic can be loaded onto reconfigurable logic blocks while the configurable hardware platform 210 is operational (e.g., after the static logic has been loaded). The configuration data corresponding to the reconfigurable logic can be stored in an on-chip or off-chip memory and/or the configuration data can be received or streamed from an interface (e.g., the interconnect interface 256) of the configurable hardware platform 210. The reconfigurable logic can be divided into non-overlapping regions, which can interface with static logic. For example, the reconfigurable regions can be arranged in an array or other regular or semi-regular structure. For example, the array structure may include holes or blockages where hard macros are placed within the array structure. The different reconfigurable regions can communicate with each other, the static logic, and the hard macros by using signal lines that can be specified as static logic. The different reconfigurable regions can be configured at different points in time so that a first reconfigurable region can be configured at a first point in time and a second reconfigurable region can be configured at a second point in time.

The functions of the configurable hardware platform 210 can be divided or categorized based upon the purpose or capabilities of the functions. For example, the functions can be categorized as control plane functions, data plane functions, and shared functions. A control plane can be used for management and configuration of the configurable hardware platform 210. The data plane can be used to manage data transfer between accelerator logic loaded onto the configurable hardware platform 210 and the server computer 220. Shared functions can be used by both the control plane and the data plane. The control plane functionality can be loaded onto the configurable hardware platform 210 prior to loading the data plane functionality. The data plane can include encapsulated reconfigurable logic configured with application logic 240. The control plane can include host logic of the configurable hardware platform 210.

Generally, the data plane and the control plane can be accessed using different functions of the configurable hardware platform 210, where the different functions are assigned to different address ranges. Specifically, the control plane functions can be accessed using a management function 252 and the data plane functions can be accessed using a data path function or an application function 254. An address mapping layer 250 can differentiate transactions bound for the control plane or the data plane. In particular, transactions from the server computer 220 bound for the configurable hardware platform 210 can be identified using an address within the transaction. Specifically, if the address of the transaction falls within the range of addresses assigned to the configurable hardware platform 210, the transaction is destined for the configurable hardware platform 210. The transaction can be sent over the physical interconnect 230 and received at the interconnect interface 256. The interconnect interface 256 can be an endpoint of the physical interconnect 230. It should be understood that the physical interconnect 230 can include additional devices (e.g., switches and bridges) arranged in a fabric for connecting devices or components to the server computer 220.

The address mapping layer 250 can analyze the address of the transaction and determine where to route the transaction within the configurable hardware platform 210 based on the address. For example, the management function 252 can be assigned a first range of addresses and different functions of the management plane can be accessed by using different addresses within that range. Transactions with addresses falling within the range assigned to the management function 252 can be routed through the host logic private fabric 260 to the different blocks of the control plane. For example, transactions can be addressed to a management and configuration block 262. Similarly, the application function 254 can be assigned a second range of addresses and different functions of the data plane can be accessed by using different addresses within that range.

The management and configuration block 262 can include functions related to managing and configuring the configurable hardware platform 210. For example, the management and configuration block 262 can provide access to the configuration access port 211 so that the reconfigurable logic blocks can be configured. For example, the server computer 220 can send a transaction to the management and configuration block 262 to initiate loading of the application logic within the encapsulated reconfigurable logic 240. The configuration data corresponding to the application logic can be sent from the server computer 220 to the management function 252. The management function 252 can route the configuration data corresponding to the application logic through the host logic fabric 260 to the configuration access port 211 so that the application logic can be loaded.

As another example, the management and configuration block 262 can store metadata about the configurable hardware platform 210. For example, versions of the different logic blocks, update histories, and other information can be stored in memory of the management and configuration block 262. The server computer 220 can read the memory to retrieve some or all of the metadata. Specifically, the server computer 220 can send a read request targeting the memory of the management and configuration block 262 and the management and configuration block 262 can generate read response data to return to the server computer 220.

The management function 252 can also be used to access private peripherals of the configurable hardware platform 210. The private peripherals are components that are only accessible from the control plane. For example, the private peripherals can include a JTAG (e.g., IEEE 1149.1) controller 270, light emitting displays (LEDs) 271, a microcontroller 272, a universal asynchronous receiver/transmitter (UART) 273, a memory 274 (e.g., a serial peripheral interface (SPI) flash memory), and any other components that are accessible from the control plane and not the data plane. The management function 252 can access the private peripherals by routing commands through the host logic private fabric 260 and the private peripheral interface(s) 275. The private peripheral interface(s) 275 can directly communicate with the private peripherals.

Public peripherals are shared functions that are accessible from either the control plane or the data plane. For example, the public peripherals can be accessed from the control plane by addressing transactions within the address range assigned to the management function 252. The public peripherals can be accessed from the data plane by addressing transactions within the address range assigned to the application function 254. Thus, the public peripherals are components that can have multiple address mappings and can be used by both the control plane and the data plane. Examples of the public peripherals are other configurable hardware platform(s) (CHP(s)) 280, DRAM 281 (e.g., DDR DRAM), storage devices 282 (e.g., hard disk drives and solid-state drives), and other various components that can be used to generate, store, or process information. The public peripherals can be accessed via the public peripheral interfaces 285. Thus, the public peripheral interfaces 285 can be an intermediary layer transposed between the public peripherals and the other functions of the configurable hardware platform 210. Specifically, the public peripheral interfaces 285 can translate requests from the control plane or the data plane and format communications to the public peripherals into a native protocol of the public peripherals.

Mailboxes 290 and watchdog timers 292 are shared functions that are accessible from either the control plane or the data plane. Specifically, the mailboxes 290 can be used to pass messages and other information between the control plane and the data plane. For example, the mailboxes 290 can include buffers, control registers (such as semaphores), and status registers. By using the mailboxes 290 as an intermediary between the control plane and the data plane, isolation between the data plane and the control plane can potentially be increased which can increase the security of the configurable hardware platform 210.

The watchdog timers 292 can be used to detect and recover from hardware and/or software malfunctions. For example, a watchdog timer 292 can monitor an amount of time taken to perform a particular task, and if the amount of time exceeds a threshold, the watchdog timer 292 can initiate an event, such as writing a value to a control register or causing an interrupt or reset to be asserted. As one example, the watchdog timer 292 can be initialized with a first value when beginning a first task. The watchdog timer 292 can automatically count down after it is initialized and if the watchdog timer 292 reaches a zero value, an event can be generated. Alternatively, if the first task finishes before the watchdog timer 292 reaches a zero value, the watchdog timer 292 can be reinitialized with a second value when beginning a second task. The first and second values can be selected based on a complexity or an amount of work to complete in the first and second tasks, respectively.

The application function 254 can be used to access the data plane functions, such as the application logic 240. For example, a transaction directed to the application logic 240 can cause data to be loaded, processed, and/or returned to the server computer 220. Specifically, the data plane functions can be accessed using transactions having an address within the range assigned to the application function 254. For example, a transaction can be sent from the server computer 220 to the application logic 240 via the application function 254. Specifically, transactions addressed to the application function 254 can be routed through the peripheral fabric 264 to the application logic 240. Responses from the application logic 240 can be routed through the peripheral fabric 264 to the application function 254, and then back to the server computer 220. Additionally, the data and transactions generated by the application logic 240 can be monitored using a usage and transaction monitoring layer 266. The monitoring layer 266 can potentially identify transactions or data that violate predefined rules and can generate an alert to be sent over the control plane. Additionally or alternatively, the monitoring layer 266 can terminate any transactions generated by the application logic 240 that violate any criteria of the monitoring layer 266. Additionally, the monitoring layer 266 can analyze information moving to or from the application logic 240 so that statistics about the information can be collected and accessed from the control plane.

Data can also be transferred between the server computer 220 and the application logic by programming a direct memory access (DMA) engine 242. The DMA engine 242 can include control and status registers for programming or specifying DMA transfers from a source location to a destination location. As one example, the DMA engine 242 can be programmed to pull information stored within the memory 224 of server computer 220 into the application logic 240 or into the public peripherals of the configurable hardware platform 210. As another example, the DMA engine 242 can be programmed to push data that has been generated by the application logic 240 to the memory 224 of the server computer 220. The data generated by the application logic 240 can be streamed from the application logic 240 or can be written to the public peripherals, such as the memory 281 or storage 282.

The application logic 240 can communicate with other configurable hardware platforms 280. For example, the other configurable hardware platforms 280 can be connected by one or more serial lines that are in communication with the SERDES 212. The application logic 240 can generate transactions to the different configurable hardware platforms 280, and the transactions can be routed through the CHP fabric 244 to the corresponding serial lines (via the SERDES 212) of the configurable hardware platforms 280. Similarly, the application logic 240 can receive information from other configurable hardware platforms 280 using the reverse path.

In sum, the functions of the configurable hardware platform 210 can be categorized as control plane functions and application functions. The control plane functions can be used to monitor and restrict the capabilities of the data plane. The data plane functions can be used to accelerate a user's application that is running on the server computer 220. By separating the functions of the control and data planes, the security and availability of the server computer 220 and other computing infrastructure can potentially be increased. For example, the application logic 240 cannot directly signal onto the physical interconnect 230 because the intermediary layers of the control plane control the formatting and signaling of transactions of the physical interconnect 230. As another example, the application logic 240 can be prevented from using the private peripherals which could be used to reconfigure the configurable hardware platform 210 and/or to access management information that may be privileged. As another example, the application logic 240 can only access hard macros of the configurable hardware platform 210 through intermediary layers so that any interaction between the application logic 240 and the hard macros is controlled using the intermediary layers.

Figure 3:
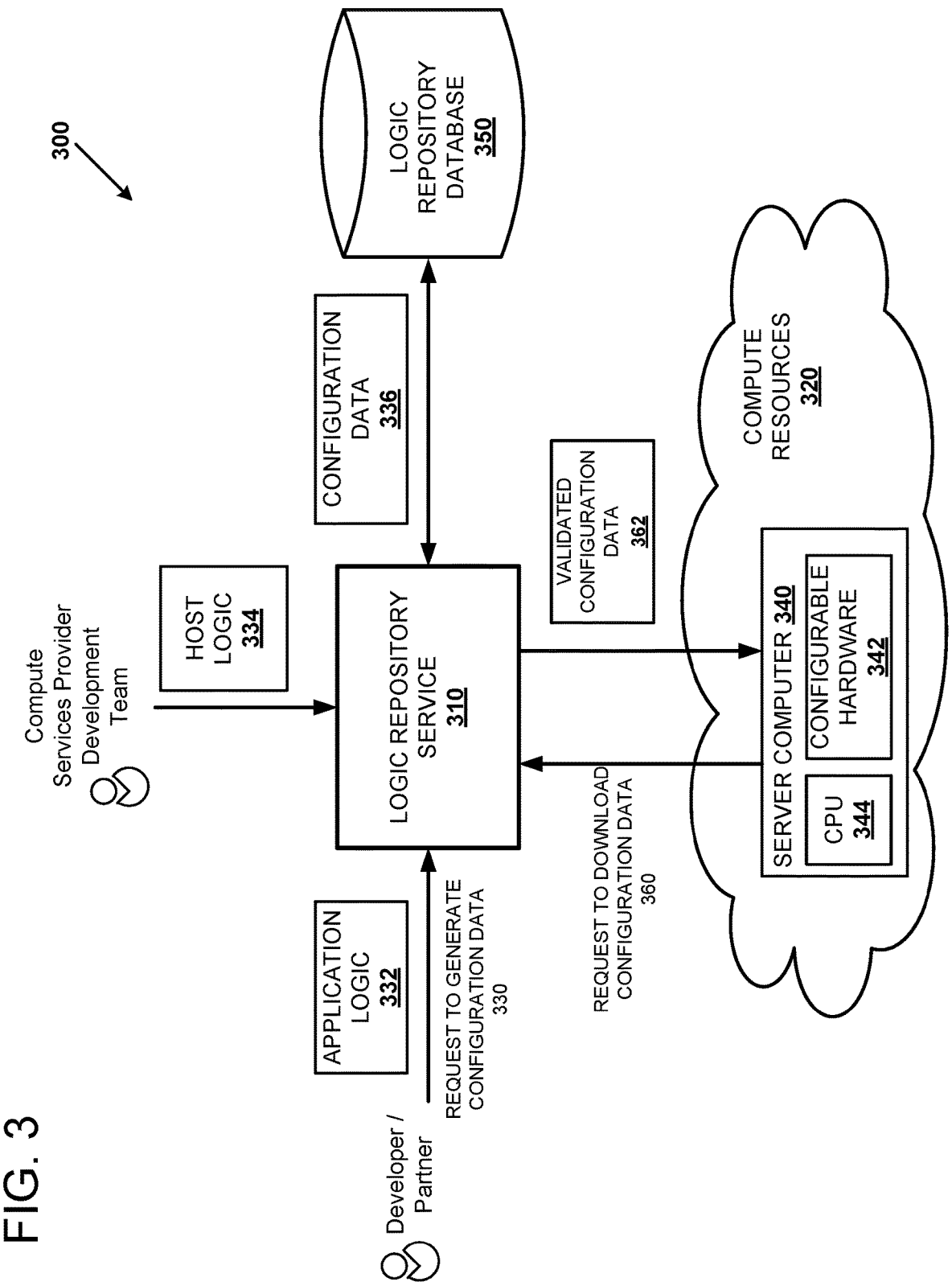
FIG. 3 is a system diagram showing an example of a system including a logic repository service for supplying configuration data to a configurable logic platform.

FIG. 3 is a system diagram showing an example of a system 300 including a logic repository service 310 for managing configuration data that can be used to configure configurable resources within a fleet of compute resources 320. A compute services provider can maintain the fleet of computing resources 320 for users of the services to deploy when a computing task is to be performed. The computing resources 320 can include server computers 340 having configurable logic resources 342 that can be programmed as hardware accelerators. The compute services provider can manage the computing resources 320 using software services to manage the configuration and operation of the configurable hardware 342. As one example, the compute service provider can execute a logic repository service 310 for ingesting application logic 332 specified by a user, generating configuration data 336 for configuring the configurable logic platform based on the logic design of the user, and downloading the validated configuration data 362 in response to a request 360 to configure an instance of the configurable logic platform. The download request 360 can be from the user that developed the application logic 332 or from a user that has acquired a license to use the application logic 332. Thus, the application logic 332 can be created by the compute services provider, a user, or a third-party separate from the user or the compute services provider. For example, a marketplace of accelerator intellectual property (IP) can be provided to the users of the compute services provider, and the users can potentially increase the speed of their applications by selecting an accelerator from the marketplace.

The logic repository service 310 can be a network-accessible service, such as a web service. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The logic repository service 310 can receive an API request 330 to generate configuration data for a configurable hardware platform, such as the configurable hardware 342 of the server computer 340. For example, the API request 330 can be originated by a developer or partner user of the compute services provider. The request 330 can include fields for specifying data and/or metadata about the logic design, the configurable hardware platform, user information, access privileges, production status, and various additional fields for describing information about the inputs, outputs, and users of the logic repository service 310. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying application logic 332 for implementation on the configurable hardware platform. Specifically, a specification of the application logic 332 and/or of the host logic 334 can be a collection of files, such as source code written in a hardware description language (HDL), a netlist generated by a logic synthesis tool, and/or placed and routed logic gates generated by a place and route tool.

The compute resources 320 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example software resources can include different operating systems, application programs, and drivers. One example instance type can comprise the server computer 340 including a central processing unit (CPU) 344 in communication with the configurable hardware 342. The configurable hardware 342 can include programmable logic such as an FPGA, a programmable logic array (PLA), a programmable array logic (PAL), a generic array logic (GAL), or a complex programmable logic device (CPLD), for example. As specific examples, an "F1.small" instance type can include a first type of server computer with one capacity unit of FPGA resources, an "F1.medium" instance type can include the first type of server computer with two capacity units of FPGA resources, an "F1.large" instance type can include the first type of server computer with eight capacity units of FPGA resources, and an "F2.large" instance type can include a second type of server computer with eight capacity units of FPGA resources.

The logic repository service 310 can generate configuration data 336 in response to receiving the API request 330. The generated configuration data 336 can be based on the application logic 332 and the host logic 334. Specifically, the generated configuration data 336 can include information that can be used to program or configure the configurable hardware 342 so that it performs the functions specified by the application logic 332 and the host logic 334. As one example, the compute services provider can generate the host logic 334 including logic for interfacing between the CPU 344 and the configurable hardware 342. Specifically, the host logic 334 can include logic for masking or shielding the application logic 332 from communicating directly with the CPU 344 so that all CPU-application logic transactions pass through the host logic 334. In this manner, the host logic 334 can potentially reduce security and availability risks that could be introduced by the application logic 332.

Generating the configuration data 336 can include performing checks and/or tests on the application logic 332, integrating the application logic 332 into a host logic 334 wrapper, synthesizing the application logic 332, and/or placing and routing the application logic 332. Checking the application logic 332 can include verifying the application logic 332 complies with one or more criteria of the compute services provider. For example, the application logic 332 can be analyzed to determine whether interface signals and/or logic functions are present for interfacing to the host logic 334. In particular, the analysis can include analyzing source code and/or running the application logic 332 against a suite of verification tests. The verification tests can be used to confirm that the application logic is compatible with the host logic. As another example, the application logic 332 can be analyzed to determine whether the application logic 332 fits within a designated region of the specified instance type. As another example, the application logic 332 can be analyzed to determine whether the application logic 332 includes any prohibited logic functions, such as ring oscillators or other potentially harmful circuits. As another example, the application logic 332 can be analyzed to determine whether the application logic 332 has any naming conflicts with the host logic 334 or any extraneous outputs that do not interface with the host logic 334. As another example, the application logic 332 can be analyzed to determine whether the application logic 332 attempts to interface to restricted inputs, outputs, or hard macros of the configurable hardware 342. If the application logic 332 passes the checks of the logic repository service 310, then the configuration data 336 can be generated. If any of the checks or tests fail, the generation of the configuration data 336 can be aborted.

Generating the configuration data 336 can include compiling and/or translating source code of the application logic 332 and the host logic 334 into data that can be used to program or configure the configurable hardware 342. For example, the logic repository service 310 can integrate the application logic 332 into a host logic 334 wrapper. Specifically, the application logic 332 can be instantiated in a system design that includes the application logic 332 and the host logic 334. The integrated system design can be synthesized, using a logic synthesis program, to create a netlist for the system design. The netlist can be placed and routed, using a place and route program, for the instance type specified for the system design. The placed and routed design can be converted to configuration data 336 which can be used to program the configurable hardware 342. For example, the configuration data 336 can be directly output from the place and route program.

As one example, the generated configuration data 336 can include a complete or partial bitstream for configuring all or a portion of the configurable logic of an FPGA. An FPGA can include configurable logic and non-configurable logic. The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different regions which can be configured independently of one another. As one example, a full bitstream can be used to configure the configurable logic across all of the regions and a partial bitstream can be used to configure only a portion of the configurable logic regions. The non-configurable logic can include hard macros that perform a specific function within the FPGA, such as input/output blocks (e.g., serializer and deserializer (SERDES) blocks and gigabit transceivers), analog-to-digital converters, memory control blocks, test access ports, and configuration logic for loading the configuration data onto the configurable logic.

The logic repository service 310 can store the generated configuration data 336 in a logic repository database 350. The logic repository database 350 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the logic repository service 310. Additionally, the logic repository service 310 can be used to store input files (such as the specifications for the application logic 332 and the host logic 334) and metadata about the logic designs and/or the users of the logic repository service 310. The generated configuration data 336 can be indexed by one or more properties such as a user identifier, an instance type or types, a marketplace identifier, a machine image identifier, and a configurable hardware identifier, for example.

The logic repository service 310 can receive an API request 360 to download configuration data. For example, the request 360 can be generated when a user of the compute resources 320 launches or deploys a new instance (e.g., an F1 instance) within the compute resources 320. As another example, the request 360 can be generated in response to a request from an application executing on an operating instance. The request 360 can include a reference to the source and/or destination instance, a reference to the configuration data to download (e.g., an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 350, and validated configuration data 362 (e.g. a full or partial bitstream) can be downloaded to the requesting instance (e.g., server computer 340). The validated configuration data 362 can be used to configure the configurable logic of the destination instance.

The logic repository service 310 can verify that the validated configuration data 362 can be downloaded to the requesting instance. Validation can occur at multiple different points by the logic repository service 310. For example, validation can include verifying that the application logic 332 is compatible with the host logic 334. In particular, a regression suite of tests can be executed on a simulator to verify that the host logic 334 performs as expected after the application logic 332 is added to the design. Additionally or alternatively, it can be verified that the application logic 332 is specified to reside only in reconfigurable regions that are separate from reconfigurable regions of the host logic 334. As another example, validation can include verifying that the validated configuration data 362 is compatible with the instance type to download to. As another example, validation can include verifying that the requestor is authorized to access the validated configuration data 362. If any of the validation checks fail, the logic repository service 310 can deny the request to download the validated configuration data 362. Thus, the logic repository service 310 can potentially safeguard the security and the availability of the computing resources 320 while enabling a user to customize hardware of the computing resources 320.

Figure 4:
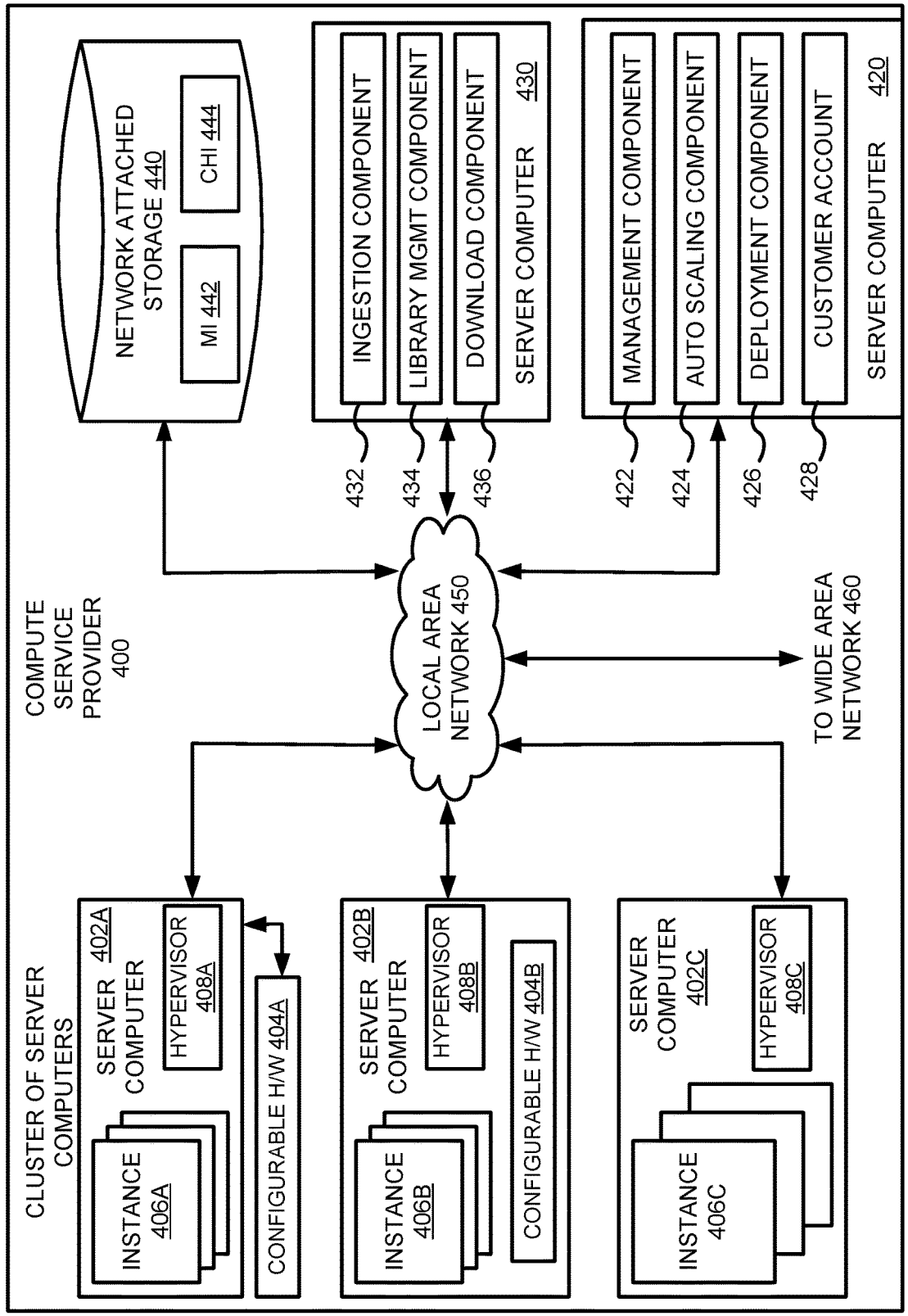
FIG. 4 is an example system diagram showing a plurality of virtual machine instances running in a multi-tenant environment including server computers having a configurable logic platform.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402C. While only three server computers are shown, any number can be used, and large centers can include thousands of server computers. The server computers 402A-402C can provide computing resources for executing software instances 406A-406C. In one embodiment, the software instances 406A-406C are virtual machines. As known in the art, a virtual machine is an instance of a software implementation of a machine (i.e. a computer) that executes applications like a physical machine. In the example of a virtual machine, each of the servers 402A-402C can be configured to execute a hypervisor 408 or another type of program configured to enable the execution of multiple software instances 406 on a single server. Additionally, each of the software instances 406 can be configured to execute one or more applications. The applications can include user or non-privileged programs, kernel or privileged programs, and/or drivers. In another embodiment (not shown), the software instances can include an operating system and application programs controlled by a single user. Thus, the computer service provider 400 can partition the resources of a given server computer among multiple customers (such as by providing a different virtual machine to each customer) and/or provide the full resources of a server computer to a single customer.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 402A-402C can include a heterogeneous collection of different hardware resources or instance types. Some of the hardware instance types can include configurable hardware that is at least partially configurable by a user of the compute service provider 400. One example of an instance type can include the server computer 402A which is in communication with configurable hardware 404A. Specifically, the server computer 402A and the configurable hardware 404A can communicate over a local interconnect such as PCIe. Another example of an instance type can include the server computer 402B and configurable hardware 404B. For example, the configurable logic 404B can be integrated within a multi-chip module or on the same die as a CPU of the server computer 402B. Yet another example of an instance type can include the server computer 402C without any configurable hardware. Thus, hardware instance types with and without configurable logic can be present within the resources of the compute service provider 400.

One or more server computers 420 can be reserved for executing software components for managing the operation of the server computers 402 and the software instances 406. For example, the server computer 420 can execute a management component 422. A customer can access the management component 422 to configure various aspects of the operation of the software instances 406 purchased by the customer. For example, the customer can purchase, rent or lease instances and make changes to the configuration of the software instances. The configuration information for each of the software instances can be stored as a machine image (MI) 442 on the network-attached storage 440. As a specific example, the MI 442 can describe the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 442 which is to be loaded on configurable hardware 404 when the instance is launched. The CHI includes configuration data for programming or configuring at least a portion of the configurable hardware 404. As another specific example, the MI 442 can describe the information used to launch an instance of an operating system directly on one of the server computers 420.

The customer can also specify settings regarding how the purchased instances are to be scaled in response to demand. The management component can further include a policy document to implement customer policies. An auto scaling component 424 can scale the instances 406 based upon rules defined by the customer. In one embodiment, the auto scaling component 424 allows a customer to specify scale-up rules for use in determining when new instances should be instantiated and scale-down rules for use in determining when existing instances should be terminated. The auto scaling component 424 can consist of a number of subcomponents executing on different server computers 402 or other computing devices. The auto scaling component 424 can monitor available computing resources over an internal management network and modify resources available based on need.

A deployment component 426 can be used to assist customers in the deployment of new instances 406 of computing resources. The deployment component can have access to account information associated with the instances, such as who is the owner of the account, credit card information, country of the owner, etc. The deployment component 426 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 426 can utilize the customer-provided configuration and cache logic to configure, prime, and launch new instances 406. For example, the deployment component 426 can be invoked when a customer launches an instance from a control console, another instance, or a marketplace page. The control console can be a web-based service that provides an interface to a customer of the compute service provider 400 so that the customer can manage his or her account and access services. As one example, the control console can enable a user to upload MIs and/or CHIs to a private catalog, and images corresponding to a particular MI or CHI can be selected by the user from the private catalog when an instance is to be deployed. The configuration, cache logic, and other information used for launching instances may be specified by a customer using the management component 422 or by providing this information directly to the deployment component 426. The instance manager can be considered part of the deployment component.

Customer account information 428 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 430 can be reserved for executing software components for managing the download of configuration data to configurable hardware 404 of the server computers 402. For example, the server computer 430 can execute a logic repository service comprising an ingestion component 432, a library management component 434, and a download component 436. The ingestion component 432 can receive host logic and application logic designs or specifications and generate configuration data that can be used to configure the configurable hardware 404. The library management component 434 can be used to manage source code, user information, and configuration data associated with the logic repository service. For example, the library management component 434 can be used to store configuration data generated from a user's design in a location specified by the user on the network-attached storage 440. In particular, the configuration data can be stored within a configurable hardware image 442 on the network-attached storage 440. Additionally, the library management component 434 can manage the versioning and storage of input files (such as the specifications for the application logic and the host logic) and metadata about the logic designs and/or the users of the logic repository service. The library management component 434 can index the generated configuration data by one or more properties such as a user identifier, an instance type, a marketplace identifier, a machine image identifier, and a configurable hardware identifier, for example. The download component 436 can be used to authenticate requests for configuration data and to transmit the configuration data to the requestor when the request is authenticated. For example, agents on the server computers 402A-B can send requests to the download component 436 when the instances 406 are launched that use the configurable hardware 404. As another example, the agents on the server computers 402A-B can send requests to the download component 436 when the instances 406 request that the configurable hardware 404 be partially reconfigured while the configurable hardware 404 is in operation.

The network-attached storage (NAS) 440 can be used to provide storage space and access to files stored on the NAS 440. For example, the NAS 440 can include one or more server computers used for processing requests using a network file sharing protocol, such as Network File System (NFS). The NAS 440 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 450.

The network 450 can be utilized to interconnect the server computers 402A-402C, the server computers 420 and 430, and the storage 440. The network 450 can be a local area network (LAN) and can be connected to a Wide Area Network (WAN) 460 so that end users can access the compute service provider 400. It should be appreciated that the network topology illustrated in FIG. 4 has been simplified and that many more networks and networking devices can be utilized to interconnect the various computing systems disclosed herein.

Figure 5:
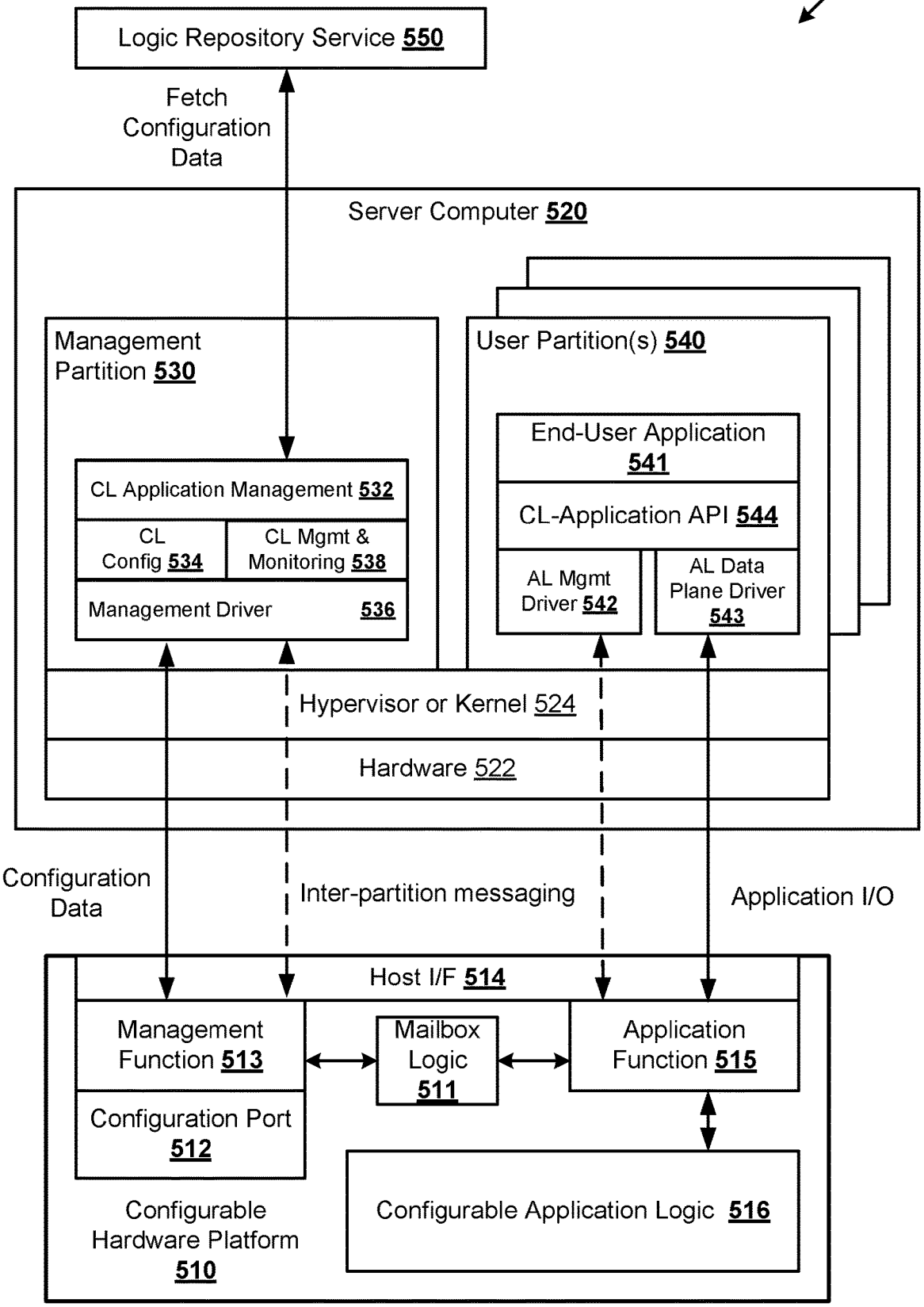
FIG. 5 shows further details of the example system of FIG. 4 including components of a control plane and a data plane for configuring and interfacing to a configurable hardware platform.

FIG. 5 shows further details of an example system 500 including components of a control plane and a data plane for configuring and interfacing to a configurable hardware platform 510. The control plane includes software and hardware functions for initializing, monitoring, reconfiguring, and tearing down the configurable hardware platform 510. The data plane includes software and hardware functions for communicating between a user's application and the configurable hardware platform 510. The control plane can be accessible by users or services having a higher privilege level and the data plane can be accessible by users or services having a lower privilege level. In one embodiment, the configurable hardware platform 510 is connected to a server computer 520 using a local interconnect, such as PCIe. In an alternative embodiment, the configurable hardware platform 510 can be integrated within the hardware of the server computer 520. As one example, the server computer 520 can be one of the plurality of server computers 402A-402B of the compute service provider 400 of FIG. 4.

The server computer 520 has underlying hardware 522 including one or more CPUs, memory, storage devices, interconnection hardware, etc. Running a layer above the hardware 522 is a hypervisor or kernel layer 524. The hypervisor or kernel layer can be classified as a type 1 or type 2 hypervisor. A type 1 hypervisor runs directly on the host hardware 522 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management partition 530 (such as Domain 0 of the Xen hypervisor) can be part of the hypervisor or separated therefrom and generally includes device drivers needed for accessing the hardware 522. User partitions 540 are logical units of isolation within the hypervisor. Each user partition 540 can be allocated its own portion of the hardware layer's memory, CPU allocation, storage, interconnect bandwidth, etc. Additionally, each user partition 540 can include a virtual machine and its own guest operating system. As such, each user partition 540 is an abstract portion of capacity designed to support its own virtual machine independent of the other partitions.

The management partition 530 can be used to perform management services for the user partitions 540 and the configurable hardware platform 510. The management partition 530 can communicate with web services (such as a deployment service, a logic repository service 550, and a health monitoring service) of the compute service provider, the user partitions 540, and the configurable hardware platform 510. The management services can include services for launching and terminating user partitions 540, and configuring, reconfiguring, and tearing down the configurable logic of the configurable hardware platform 510. As a specific example, the management partition 530 can launch a new user partition 540 in response to a request from a deployment service (such as the deployment component 426 of FIG. 4). The request can include a reference to an MI and/or a CHI. The MI can specify programs and drivers to load on the user partition 540 and the CHI can specify configuration data to load on the configurable hardware platform 510. The management partition 530 can initialize the user partition 540 based on the information associated with the MI and can cause the configuration data associated with the CHI to be loaded onto the configurable hardware platform 510. The initialization of the user partition 540 and the configurable hardware platform 510 can occur concurrently so that the time to make the instance operational can be reduced.

The management partition 530 can be used to manage programming and monitoring of the configurable hardware platform 510. By using the management partition 530 for this purpose, access to the configuration data and the configuration ports of the configurable hardware platform 510 can be restricted. Specifically, users with lower privilege levels can be restricted from directly accessing the management partition 530. Thus, the configurable logic cannot be modified without using the infrastructure of the compute services provider and any third party IP used to program the configurable logic can be protected from viewing by unauthorized users.

The management partition 530 can include a software stack for the control plane to configure and interface to a configurable hardware platform 510. The control plane software stack can include a configurable logic (CL) application management layer 532 for communicating with web services (such as the logic repository service 550 and a health monitoring service), the configurable hardware platform 510, and the user partitions 540. For example, the CL application management layer 532 can issue a request to the logic repository service 550 to fetch configuration data in response to a user partition 540 being launched. The CL application management layer 532 can communicate with the user partition 540 using shared memory of the hardware 522 or by sending and receiving inter-partition messages over the interconnect connecting the server computer 520 to the configurable hardware platform 510. Specifically, the CL application management layer 532 can read and write messages to mailbox logic 511 of the configurable hardware platform 510. The messages can include requests by an end-user application 541 to reconfigure or tear-down the configurable hardware platform 510. The CL application management layer 532 can issue a request to the logic repository service 550 to fetch configuration data in response to a request to reconfigure the configurable hardware platform 510. The CL application management layer 532 can initiate a tear-down sequence in response to a request to tear down the configurable hardware platform 510. The CL application management layer 532 can perform watchdog related activities to determine whether the communication path to the user partition 540 is functional.

The control plane software stack can include a CL configuration layer 534 for accessing the configuration port 512 (e.g., a configuration access port) of the configurable hardware platform 510 so that configuration data can be loaded onto the configurable hardware platform 510. For example, the CL configuration layer 534 can send a command or commands to the configuration port 512 to perform a full or partial configuration of the configurable hardware platform 510. The CL configuration layer 534 can send the configuration data (e.g., a bitstream) to the configuration port 512 so that the configurable logic can be programmed according to the configuration data. The configuration data can specify host logic and/or application logic.

The control plane software stack can include a management driver 536 for communicating over the physical interconnect connecting the server computer 520 to the configurable hardware platform 510. The management driver 536 can encapsulate commands, requests, responses, messages, and data originating from the management partition 530 for transmission over the physical interconnect. Additionally, the management driver 536 can de-encapsulate commands, requests, responses, messages, and data sent to the management partition 530 over the physical interconnect. Specifically, the management driver 536 can communicate with the management function 513 of the configurable hardware platform 510. For example, the management function 513 can be a physical or virtual function mapped to an address range during an enumeration of devices connected to the physical interconnect. The management driver 536 can communicate with the management function 513 by addressing transactions to the address range assigned to the management function 513.

The control plane software stack can include a CL management and monitoring layer 538. The CL management and monitoring layer 538 can monitor and analyze transactions occurring on the physical interconnect to determine a health of the configurable hardware platform 510 and/or to determine usage characteristics of the configurable hardware platform 510.

The configurable hardware platform 510 can include non-configurable hard macros and configurable logic. The hard macros can perform specific functions within the configurable hardware platform 510, such as input/output blocks (e.g., serializer and deserializer (SERDES) blocks and gigabit transceivers), analog-to-digital converters, memory control blocks, test access ports, and a configuration port 512. The configurable logic can be programmed or configured by loading configuration data onto the configurable hardware platform 510. For example, the configuration port 512 can be used for loading the configuration data. As one example, configuration data can be stored in a memory (such as a Flash memory) accessible by the configuration port 512 and the configuration data can be automatically loaded during an initialization sequence (such as during a power-on sequence) of the configurable hardware platform 510. Additionally, the configuration port 512 can be accessed using an off-chip processor or an interface within the configurable hardware platform 510.

The configurable logic can be programmed to include host logic and application logic. The host logic can shield the interfaces of at least some of the hard macros from the end-users so that the end-users have limited access to the hard macros and to the physical interconnect. For example, the host logic can include the mailbox logic 511, the configuration port 512, the management function 513, the host interface 514, and the application function 515. The end-users can cause the configurable application logic 516 to be loaded on the configurable hardware platform 510, and can communicate with the configurable application logic 516 from the user partitions 540 (via the application function 515).

The host interface logic 514 can include circuitry (e.g., hard macros and/or configurable logic) for signaling on the physical interconnect and implementing a communications protocol. The communications protocol specifies the rules and message formats for communicating over the interconnect. The application function 515 can be used to communicate with drivers of the user partitions 540. Specifically, the application function 515 can be a physical or virtual function mapped to an address range during an enumeration of devices connected to the physical interconnect. The application drivers can communicate with the application function 515 by addressing transactions to the address range assigned to the application function 515. Specifically, the application function 515 can communicate with an application logic management driver 542 to exchange commands, requests, responses, messages, and data over the control plane. The application function 515 can communicate with an application logic data plane driver 543 to exchange commands, requests, responses, messages, and data over the data plane.

The mailbox logic 511 can include one or more buffers and one or more control registers. For example, a given control register can be associated with a particular buffer and the register can be used as a semaphore to synchronize between the management partition 530 and the user partition 540. As a specific example, if a partition can modify a value of the control register, the partition can write to the buffer. The buffer and the control register can be accessible from both the management function 513 and the application function 515. When the message is written to the buffer, another control register (e.g., the message ready register) can be written to indicate the message is complete. The message ready register can polled by the partitions to determine if a message is present, or an interrupt can be generated and transmitted to the partitions in response to the message ready register being written.

The user partition 540 can include a software stack for interfacing an end-user application 540 to the configurable hardware platform 510. The application software stack can include functions for communicating with the control plane and the data plane. Specifically, the application software stack can include a CL-Application API 544 for providing the end-user application 540 with access to the configurable hardware platform 510. The CL-Application API 544 can include a library of methods or functions for communicating with the configurable hardware platform 510 and the management partition 530. For example, the end-user application 541 can send a command or data to the configurable application logic 516 by using an API of the CL-Application API 544. In particular, the API of the CL-Application API 544 can interface with the application logic (AL) data plane driver 543 which can generate a transaction targeted to the application function 515 which can communicate with the configurable application logic 516. In this manner, the end-user application 541 can cause the configurable application logic 516 receive, process, and/or respond with data to potentially accelerate tasks of the end-user application 541. As another example, the end-user application 541 can send a command or data to the management partition 530 by using an API of the CL-Application API 544. In particular, the API of the CL-Application API 544 can interface with the AL management driver 542 which can generate a transaction targeted to the application function 515 which can communicate with the mailbox logic 511. In this manner, the end-user application 541 can cause the management partition 530 to provide operational or metadata about the configurable hardware platform 510 and/or to request that the configurable application logic 516 be reconfigured.

The application software stack in conjunction with the hypervisor or kernel 524 can be used to limit the operations available to perform over the physical interconnect by the end-user application 541. For example, the compute services provider can provide the AL management driver 542, the AL data plane driver 543, and the CL-Application API 544 (such as by associating the files with a machine image). These components can be protected from modification by only permitting users and services having a higher privilege level than the end-user to write to the files. The AL management driver 542 and the AL data plane driver 543 can be restricted to using only addresses within the address range of the application function 515. Additionally, an input/output memory management unit (I/O MMU) can restrict interconnect transactions to be within the address ranges of the application function 515 or the management function 513.

Figure 6:
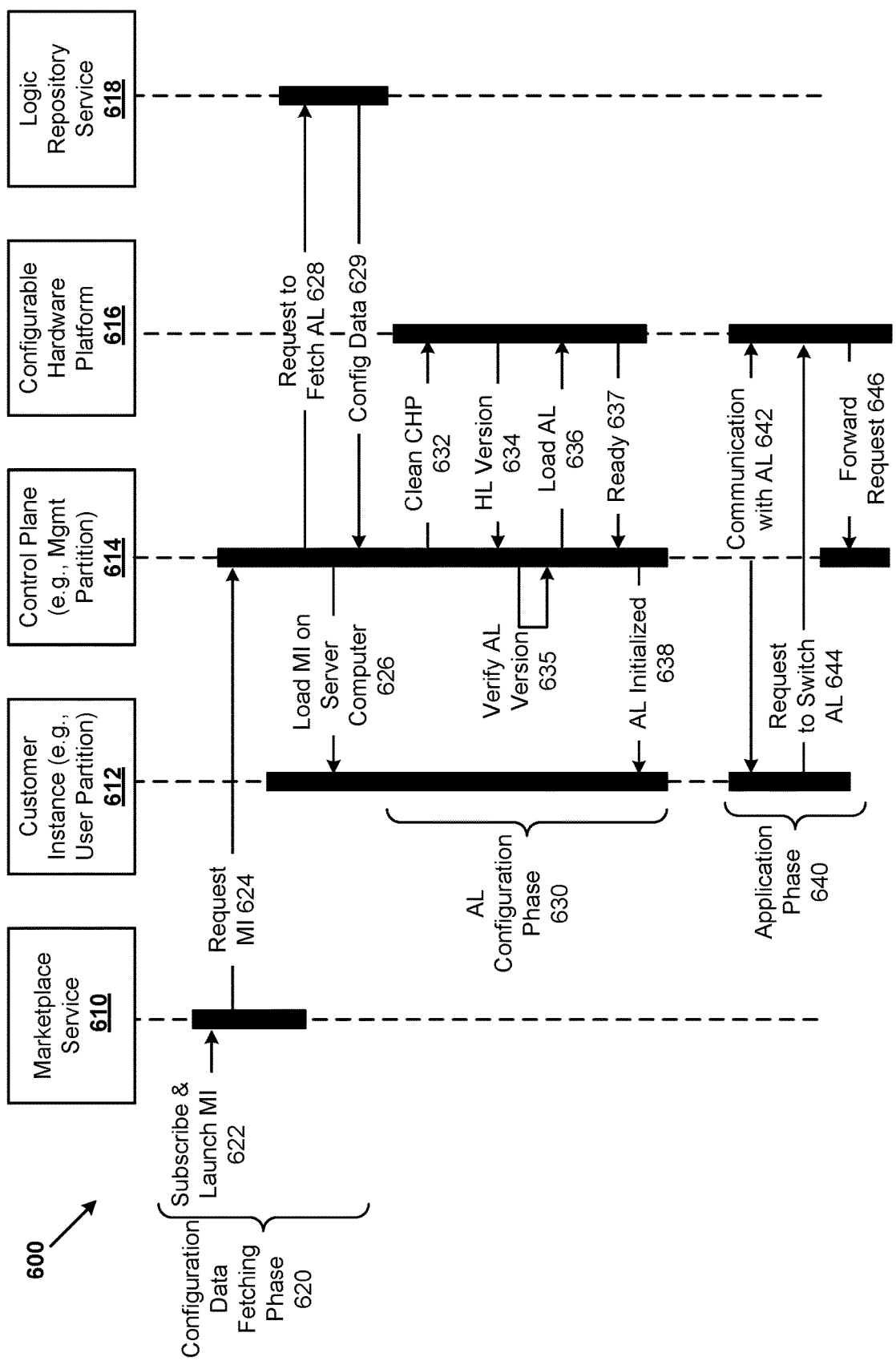
FIG. 6 is a sequence diagram of an example method of fetching, configuring, and using configuration data for configurable hardware in a multi-tenant environment.

FIG. 6 is a sequence diagram of an example method 600 of fetching configuration data, configuring an instance of configurable hardware in a multi-tenant environment using the configuration data, and using the instance of the configurable hardware. The sequence diagram illustrates a series of steps used by different elements of the compute services infrastructure that are used to configure the configurable logic. As one example, the infrastructure components of the compute services provider can include a marketplace 610, a customer instance 612, a control plane 614, a configurable hardware platform 616, and a logic repository service 618. The marketplace service 610 can receive configuration data for hardware accelerators created by end-users or by independent hardware developers that provide or market their accelerators to end-users of the compute services provider. The marketplace service 610 can provide a listing of accelerators that are available for purchase or for licensing so that end-users can find a hardware accelerator suited for their needs. The customer instance 612 can include software (such as a virtual machine, operating system, and/or application software) executing on a server computer, where the software is launched in response to an end-user deploying resources of the compute services provider. The server computer can be executing control plane software 614, which can be used to manage the configuration of the configurable hardware platform 616. The configurable hardware platform 616 can include reconfigurable logic and host logic, as described above. The logic repository service 618 can include a repository of configuration data that can be indexed by product codes, machine instance identifiers, and/or configurable hardware identifiers, for example. The logic repository service 618 can receive a request for configuration data using one of the indexes, and can return the configuration data to the control plane.

The components of the compute service provider infrastructure can be used at various phases during the deployment and use of a customer instance 612. For example, the phases can include a configuration data fetching phase 620, an application logic configuration phase 630, and an application phase 640.

The configuration data fetching phase 620 can include identifying and fetching application logic from a logic repository service 618. Specifically, an end-user of the compute services can subscribe and launch 622 a machine instance using the marketplace service 610, a control console, or another instance. The marketplace service 610 can initiate a flow that causes an instance of a machine image to be loaded 624 on a server computer so that a customer instance 612 can initialized. The machine image can include application software written and/or used by the end-user and control plane software provided by the compute services provider. A request 624 to load the machine image can be sent from the marketplace service 610 to the control plane 614 executing on the server computer. For example, the control plane 614 can download the machine image from a storage service (not shown) and the machine image can be loaded 626 on the server computer. Fetching, loading, and booting the machine image within a virtual machine instance can potentially be time-consuming, so the control plane 614 can send a request to fetch 628 configuration data corresponding to the application logic from the logic repository service 618 in parallel with the fetching and loading of the machine image. It should be noted that the operations to fetch the machine image from storage and fetch the application logic from the logic repository service 618 can occur in series or in parallel. The logic repository service 618 can reply 629 with the configuration data. Thus, the control plane software at 614 can receive a copy of configuration data corresponding to the application logic so that the application logic can be loaded onto the configurable hardware platform.

The configuration phase 630 can include loading the configuration data onto the configurable hardware platform 616. The configuration phase 630 can include cleaning 632 the configurable hardware platform. For example, cleaning 632 the configurable hardware platform can include writing to any memories (e.g., the public peripherals) in communication with the configurable hardware platform so that a prior customer's data is not observable by the present customer. Cleaning 632 the memories can include writing all zeroes, writing all ones, and/or writing random patterns to the storage locations of the memories. Additionally, the configurable logic memory of the configurable hardware platform 616 can be fully or partially scrubbed. After the configurable hardware platform 616 is cleaned, a host logic version that is loaded on the configurable hardware platform 616 can be returned 634 to the control plane 614. The host logic version can be used to verify 635 whether the application logic is compatible with the host logic that is loaded on the configurable hardware platform 616. If the host logic and application logic are not compatible, then the configuration phase 630 can abort (not shown). Alternatively, if the host logic and the application logic are compatible, then the configuration phase 630 can continue at 636. The application logic can be copied from the control plane 614 to the configurable hardware platform 616 so that the application logic can be loaded 636 into the configurable hardware platform 616. After loading 636, the configurable hardware platform 616 can indicate 637 that the functions (e.g., the application logic) loaded on the configurable hardware platform 616 is ready. The control plane 614 can indicate 638 to the customer instance 612 that the application logic is initialized and ready for use. Alternatively, the control plane 614 can prevent the virtual machine from completing an initialization or boot sequence until the indication 637 is received by the control plane 614 so that the virtual machine cannot begin executing until the configurable hardware platform 616 is configured.

The application phase 640 can begin after the application logic is initialized. The application phase 640 can include executing the application software on the customer instance 612 and executing the application logic on the configurable hardware platform 616. In particular, the application software of the customer instance 612 can be in communication 642 with the application logic of the configurable hardware platform 616. For example, the application software can cause data to be transferred to the application logic, the data can be processed by the application logic, and the processed data and/or status information can be returned to the application software. The application logic can include specialized or customized hardware that can potentially accelerate processing speed compared to using only software on a general purpose computer. The application logic can perform the same functions for the duration of the customer instance 612 or the application logic can be adapted or reconfigured while the customer instance 612 is executing. For example, the application software executing on the customer instance 612 can request that different application logic be loaded onto the configurable hardware platform 616, or additional application logic can be loaded on to a second configurable hardware platform (not illustrated). In particular, the application software can issue a request 644 to the configurable hardware platform 616 which can forward 646 the request to the control plane 614 or a customer can submit an API request to logic repository service or a compute service specifying an identifier of the instance, an identifier for the application logic, and a parameter that indicates to add a configurable hardware platform to the instance. The control plane 614 can begin fetching the new application logic at 628 from the logic repository service 618. When new application logic is loaded onto a running customer instance, the cleaning 632 step can be omitted since the customer is not changing for the customer instance 612.

Additionally, a tear-down phase (not shown) can be used to clean the configurable hardware platform 616 so that customer data is further protected. For example, the memories of the configurable hardware platform 616 can be scrubbed and/or the configuration logic memories associated with the application logic can be scrubbed as part of a tear-down sequence when a customer stops using the customer instance 612.

Figure 7:
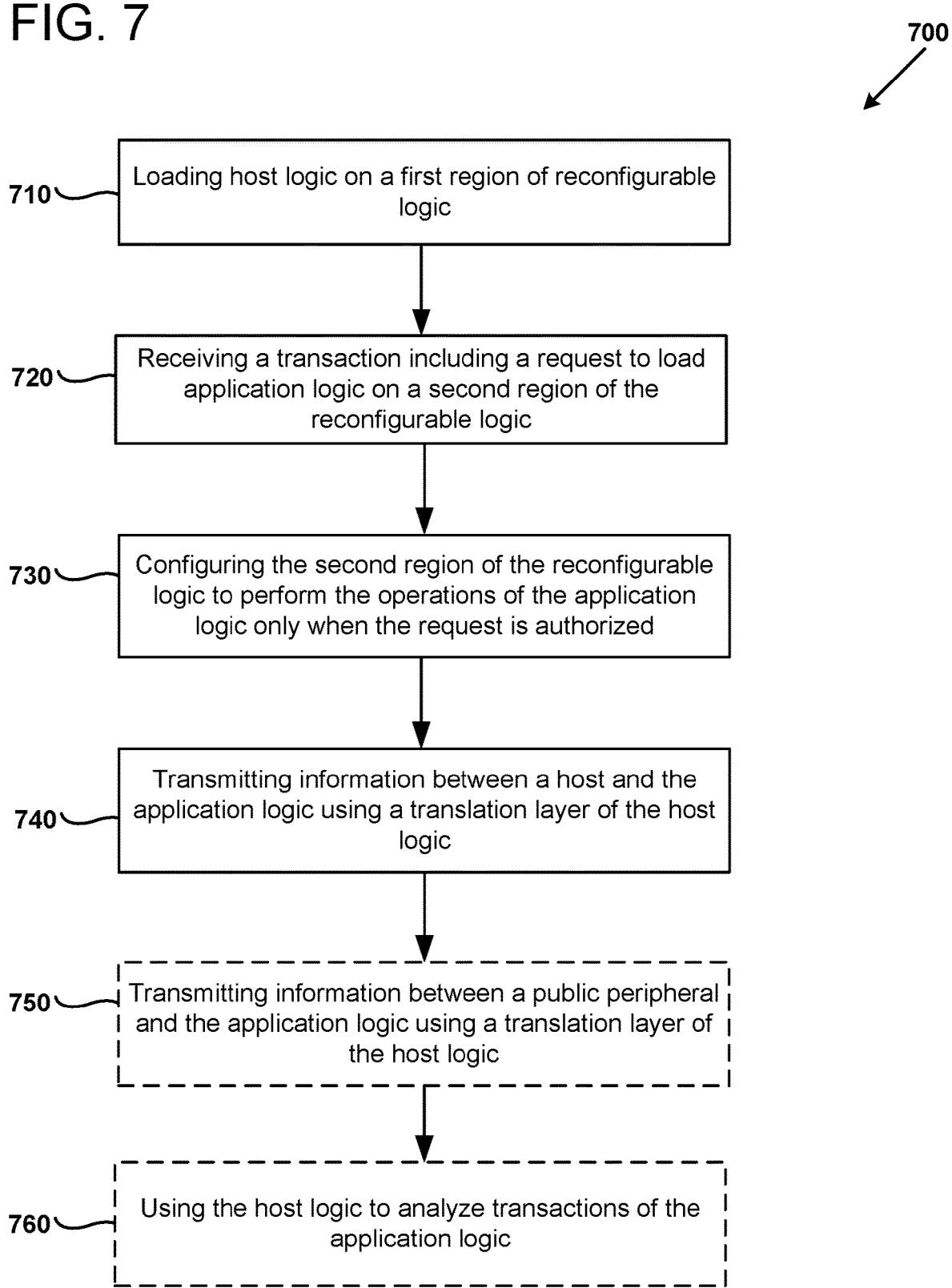
FIG. 7 is a flow diagram of an example method of using a configurable hardware platform.

FIG. 7 is a flow diagram of an example method 700 of using a configurable hardware platform. At 710, host logic can be loaded on a first region of reconfigurable logic so that the configurable hardware platform performs operations of the host logic. The host logic can include a control plane function used for enforcing restricted access for transactions from the host interface. For example, the control plane function can reject transactions that are outside of an address range assigned to the control plane function. Additionally, the host logic can include logic for limiting or restricting the application logic from using hard macros of the configurable hardware platform and accessing the physical interfaces to a host device. Thus, the host logic can encapsulate the application logic so that the interfaces to hard macros and to other components of the computing infrastructure are managed by the host logic.

The host logic can be loaded at one time or incrementally. For example, the host logic can include static logic that is loaded upon deassertion of a reset signal of the configurable hardware platform. As a specific example, configuration data corresponding to the static logic can be stored in a flash memory of the configurable hardware platform, and the contents of the flash memory can be used to program the configurable hardware platform with the static host logic. In one embodiment, the static logic can be loaded without intervention by a host computer (e.g., a customer instance). Additionally or alternatively, the host logic can include reconfigurable logic that is loaded after the static logic is loaded. For example, the reconfigurable host logic can be added while the static host logic is operating. In particular, the reconfigurable host logic can be loaded upon receiving a transaction requesting that the reconfigurable host logic be loaded. For example, the transaction can be transmitted from a host computer over a physical interconnect connecting the configurable hardware platform to the host computer.

By dividing the host logic into a static logic component and a reconfigurable logic component, the host logic can be incrementally loaded onto the configurable hardware platform. For example, the static logic can include base functionality of the host logic, such as communication interfaces, enumeration logic, and configuration management logic. By providing the communication interfaces in the static logic, the configurable hardware platform can be discovered or enumerated on the physical interconnect as the computing system is powered on and/or is reset. The reconfigurable logic can be used to provide updates to the host logic and to provide higher-level functionality to the host logic. For example, some interconnect technologies have time limits for enumerating devices attached to the interconnect. The time to load host logic onto the configurable hardware platform can be included in the time budget allotted for enumeration and so the initial host logic can be sized to be loaded relatively quickly. Thus, the static logic can be a subset of the host logic functionality so that the configurable hardware platform can be operational within the time limits specified by the interconnect technology. The reconfigurable logic can provide additional host logic functionality to be added after the enumeration or boot up sequence is complete. As one example, host logic that is associated with the data plane (such as a DMA engine, CHP fabric, peripheral fabric, or a public peripheral interface) can be loaded as reconfigurable logic after the static logic has been loaded.

At 720, a transaction including a request to load application logic on a second region of the reconfigurable logic can be received. The second region of the reconfigurable logic can be non-overlapping with the first region of the reconfigurable logic so that the host logic is not modified. Additionally, the second region of the reconfigurable logic can have an interface to static host logic. As one example, the transaction including the request to load the application logic can target a control register of the host logic to initiate loading the application logic.

At 730, the second region of the reconfigurable logic can be configured to perform the operations of the application logic only when the request to load the application logic is authorized. The request can be authorized in a variety of ways. For example, the request can include an address, and the request can be authorized when the address matches a predefined address or falls within a range of addresses assigned to the host logic. As a specific example, a control register for controlling loading of the application logic can be assigned or mapped to an address, and the request can be authorized when it includes the address corresponding to the control register. Additionally or alternatively, the request can include an authorization token that is verified by the host logic to determine whether the request is authorized.

At 740, information between the host computer and the application logic can be transmitted using a translation layer of the host logic. For example, the application logic can use a streaming interface of the translation layer and the translation layer can format packets or transactions conforming to formatting and size specifications of the interconnection fabric. By using the translation layer, the security and availability of the host computer can potentially be increased because the application logic can be restricted from directly creating transactions and/or viewing transactions of the physical interconnect. Thus, the use of the translation layer can protect the integrity and privacy of transactions occurring on the physical interconnect.

At 750, information between a public peripheral and the application logic can be transmitted using a translation layer of the host logic. As described above, the public peripherals can include memory and/or other configurable hardware platforms. The translation layer can format all transfers between the public peripheral and the application logic so that the application logic is not burdened with conforming to low-level details of the transfer protocol and so that public peripherals are not misused (such as by causing a malfunction or accessing privileged information).

At 760, the host logic can be used to analyze transactions of the application logic. For example, the host logic can track operational characteristics, such as bandwidth, latency, and other performance characteristics of the application logic and/or the host logic. As another example, the host logic can analyze transactions to determine if the transactions conform to predefined criteria. If the transactions do not conform to the criteria, then the host logic can potentially cancel transactions originating at the application logic.

Figure 8:
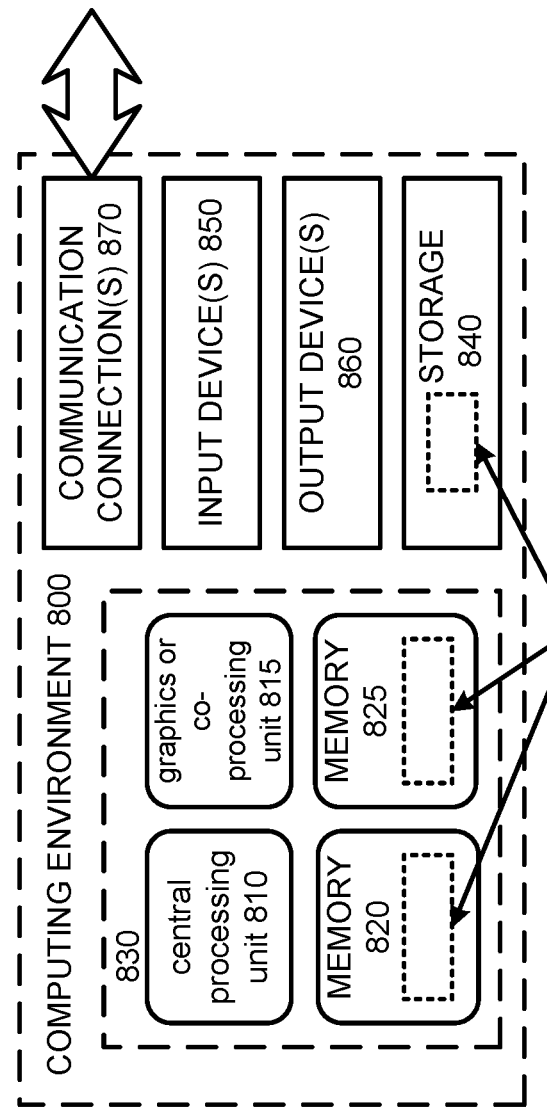
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. An apparatus comprising:
a configuration access port;
a reconfigurable logic region comprising hardware that is configurable to implement application logic accessed via the configuration access port; and
host logic for encapsulating the reconfigurable logic region, the host logic comprising:
a host interface for communicating with a processor;
a management function accessible via the host interface, the management function adapted to provide access to the application logic at the configuration access port and cause the reconfigurable logic region to be configured with the application logic; and
a data path function accessible via the host interface, the data path function configured to format data transfers between the host interface and the application logic, the data path function being separate from the management function.

2. The apparatus of claim 1, wherein the management function causes the reconfigurable logic region to be configured with the application logic in response to an authorized transaction received at the host interface.

3. The apparatus of claim 2, wherein the authorized transaction received at the host interface comprises an address within an address range assigned to the management function.

4. The apparatus of claim 2, wherein at least a portion of the host logic is reconfigurable logic that is loaded on the apparatus in response to the authorized transaction received at the host interface.

5. The apparatus of claim 1, wherein at least a portion of the host logic is static logic that is loaded on the apparatus in response to a reset of the apparatus being deasserted.

6. The apparatus of claim 1, wherein the host logic further comprises a translation layer between the application logic and a public peripheral, the translation layer adapted to format data transfers between the application logic and logic of the apparatus used for communicating with the public peripheral.

7. The apparatus of claim 6, wherein the public peripheral is a field programmable gate array and the logic includes a serializer-deserializer transceiver.

8. The apparatus of claim 1, wherein formatting the data transfers between the host interface and the application logic includes partitioning data from the data transfers into blocks.

9. The apparatus of claim 1, wherein the host logic further comprises an interface to a private peripheral, the private peripheral being inaccessible to the application logic and the data path function.

10. The apparatus of claim 1, wherein the host logic further comprises mailbox logic for passing messages between the management function and the data path function.

11. A method for operating a configurable hardware platform comprising a configuration access port, a reconfigurable logic region, and host logic that encapsulates the reconfigurable logic region, the method comprising:
communicating, by the host logic, with a processor using a host interface of the host logic;
providing, by a management function of the host logic, access to application logic at the configuration access port; and
causing, by the management function of the host logic, the reconfigurable logic region to be configured with the application logic, wherein the reconfigurable logic region comprises hardware that is configurable to implement the application logic;
wherein the host logic further comprises a data path function accessible via the host interface, the data path function configured to format data transfers between the host interface and the application logic, the data path function being separate from the management function.

12. The method of claim 11, wherein the management function causes the reconfigurable logic region to be configured with the application logic in response to an authorized transaction received at the host interface.

13. The method of claim 12, wherein the authorized transaction received at the host interface comprises an address within an address range assigned to the management function.

14. The method of claim 12, wherein at least a portion of the host logic is reconfigurable logic that is loaded on the configurable hardware platform in response to the authorized transaction received at the host interface.

15. The method of claim 11, wherein at least a portion of the host logic is static logic that is loaded on the configurable hardware platform in response to a reset of the configurable hardware platform being deasserted.

16. The method of claim 11, wherein the host logic further comprises a translation layer between the application logic and a public peripheral, the translation layer adapted to format data transfers between the application logic and logic of the configurable hardware platform used for communicating with the public peripheral.

17. The method of claim 16, wherein the public peripheral is a field programmable gate array and the logic includes a serializer-deserializer transceiver.

18. The method of claim 11, wherein formatting the data transfers between the host interface and the application logic includes partitioning data from the data transfers into blocks.

19. The method of claim 11, wherein the host logic further comprises an interface to a private peripheral, the private peripheral being inaccessible to the application logic and the data path function.

20. The method of claim 11, wherein the host logic further comprises mailbox logic for passing messages between the management function and the data path function.

* * * * *